United States Patent
Murakami et al.

[11] Patent Number: 5,982,133
[45] Date of Patent: Nov. 9, 1999

[54] BRUSHLESS MOTOR WITH ROTOR POSITION DETECTION COMPENSATION CAUSED BY INDUCED VOLTAGE IN ROTOR

[75] Inventors: Hiroshi Murakami, Suita; Kazushige Narazaki; Yukio Honda, both of Katano; Naoyuki Kadoya, Kadoma; Masayuki Shinto, Sabae; Hiroshi Ito; Yoshinari Asano, both of Takefu, all of Japan

[73] Assignee: Matsushita Electric Industrial Co., Ltd., Osaka-fu, Japan

[21] Appl. No.: 08/685,081

[22] Filed: Jul. 23, 1996

[30] Foreign Application Priority Data

Jul. 28, 1995 [JP] Japan .................................. 7-193000

[51] Int. Cl.[6] ....................................................... G05F 1/10
[52] U.S. Cl. .......................... 318/650; 318/254; 318/802; 318/432
[58] Field of Search ..................... 318/254, 439, 318/138, 650, 432, 434, 798–811

[56] References Cited

U.S. PATENT DOCUMENTS

| 4,855,653 | 8/1989 | Lemirande | 318/282 |
| 5,337,013 | 8/1994 | Langer et al. | 324/537 |
| 5,616,993 | 4/1997 | Lu et al. | 318/254 |
| 5,616,996 | 4/1997 | Tang et al. | 318/439 |
| 5,631,999 | 5/1997 | Dinsmore | 388/805 |
| 5,650,886 | 7/1997 | Codilian et al. | 360/73.03 |
| 5,672,948 | 9/1997 | Cohen et al. | 318/603 |

FOREIGN PATENT DOCUMENTS

| 58-25038 | 5/1983 | Japan . |
| 59-36519 | 9/1984 | Japan . |
| 61-112590 | 5/1986 | Japan . |

*Primary Examiner*—Brian Sircus
*Attorney, Agent, or Firm*—Akin, Gump, Strauss, Hauer & Feld, L.L.P.

[57] ABSTRACT

A brushless motor having at least one current influence detector (10a, 10b, 10c) for detecting influence of an induced voltage caused by variations of current flowing in an armature winding (3). Furthermore, a positional signal detecting circuit means (11) detects a positional signal corresponding to rotational position of the rotor (2) in accordance with the voltage signal appearing at the armature winding (3) and the output signal issued from the at least one current influence detector (10a, 10b, 10c).

4 Claims, 8 Drawing Sheets

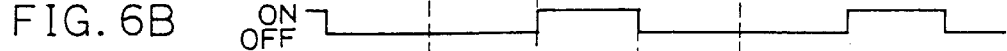

BRUSHLESS MOTOR WITH ROTOR POSITION DETECTION COMPENSATION CAUSED BY INDUCED VOLTAGE IN ROTOR

FIELD OF THE INVENTION AND RELATED ART STATEMENT

1. Field of the Invention

This invention relates to a sensorless type brushless motor to be driven and controlled by field weakening control in order to obtain high rotational speed and/or high output torque.

2. Description of the Related Art Statement

A brushless motor is driven and controlled by detecting a rotational position of a rotor. In a sensorless type brushless motor, the rotational position is generally detected by finding variation of an induced voltage (Electro Magnetic Force) appearing on a coil of the motor without use of a position sensor.

The conventional sensorless type brushless motor is described in the unexamined published Japanese patent application (TOKKAI) SHO 61-112590 and the examined published Japanese patent applications (TOKKO) SHO 59-36519 and (TOKKO) SHO 58-25038.

FIG. 5 is a circuit diagram showing a conventional sensorless type brushless motor.

In FIG. 5, a conventional sensorless type brushless motor 31 comprises a rotor 32 having a magnet and an armature winding 33 to be made in interlinkage with a magnetic flux of a magnetic field generated from the magnet of the rotor 32. The armature winding 33 is constituted with three coils 33a, 33b, and 33c defined as A-phase, B-phase, and C-phase, respectively. The three coils 33a, 33b, and 33c are connected in three-phase star connection. The three coils 33a, 33b, and 33c are connected to a direct current power supply 34 through a semiconductor commutator device 35, so that the three coils 33a, 33b, and 33c are supplied with currents each having phase difference of 120° therebetween. When the current is applied to the three coils 33a, 33b, and 33c, the rotor 32 is rotated by the magnetic field generated from the three coils 33a, 33b, and 33c.

The semiconductor commutator device 35 has six switching element parts each consisting of a MOS FET and a protective diode for the MOS FET. That is, six MOS FETs 36a–36f and six protective diodes 37a–37f for the respective six MOS FETs 36a–36f are provided in the semiconductor commutator device 35.

The six MOS FETs 36a–36f are connected in three-phase bridge connection in the semiconductor commutator device 35. Each drain of the MOS FETs 36a, 36b, and 36c is connected to a positive electrode of the direct current power supply 34, and each source of the MOS FETs 36d, 36e, and 36f is connected to a negative electrode of the direct current power supply 34. Furthermore, a source of the MOS FET 36a and a drain of the MOS FET 36d are connected to an output terminal 35a of the semiconductor commutator device 35. Similarly, a source of the MOS FET 36b and a drain of the MOS FET 36e are connected to an output terminal 35b, and also, a source of the MOS FET 36c and a drain of the MOS FET 36f are connected to an output terminal 35c. Each gate of the six MOS FETs 36a–36f receives control signal issued from the below-mentioned control circuit unit 39. Thereby, each switching state of the six MOS FETs 36a36f is controlled by the control circuit unit 39.

The output terminal 35a is connected to a terminal 33d of the coil 33a. Similarly, the output terminal 35b is connected to a terminal 33f of the coil 33b, and also, the output terminal 35c is connected to a terminal 33e of the coil 33c.

The three terminals 33d, 33f, and 33e are connected to a positional signal detecting circuit unit 38. The positional signal detecting circuit unit 38 detects a positional signal corresponding to the rotational position of the rotor 32 every phase of the three-phase. The three positional signals of respective phases are obtained in accordance with three voltage signals $V_A$, $V_B$, and $V_C$, induced at the three terminals 33d, 33f, and 33e, respectively. The positional signal detecting circuit unit 38 issues the three positional signals to a control circuit unit 39. The control circuit unit 39 issues six control signals to the respective gates of the six MOS FETs 36a–36f in accordance with the three positional signals. Thereby, as has been explained in the above, each switching state of the six MOS FETs 36a–36f is controlled by the control circuit unit 39, and the rotor 32 is rotated.

Driving method of the conventional brushless motor 31 will be explained with reference to FIG. 6A through FIG. 6I concretely.

FIG. 6A is a waveform chart showing a switching state of the MOS FET 36a. FIG. 6B is a waveform chart showing a switching state of the MOS FET 36b. FIG. 6C is a waveform chart showing a switching state of the MOS FET 36c. FIG. 6D is a waveform chart showing a switching state of the MOS FET 36d. FIG. 6E is a waveform chart showing a switching state of the MOS FET 36e. FIG. 6F is a waveform chart showing a switching state of the MOS FET 36f. FIG. 6G is a waveform chart showing a voltage signal $V_A$. FIG. 6H is a waveform chart showing a voltage signal $V_B$. FIG. 6I is a waveform chart showing a voltage signal $V_C$. In FIG. 6A through FIG. 6F, the abscissa is graduated with time, and the ordinate is graduated with switching state. In FIG. 6G through FIG. 6I, the abscissa is graduated with time, and the ordinate is graduated with voltage. FIG. 6A through FIG. 6I are drawn with their timing positions (represented by vertical broken lines) in agreement with each other. The conventional brushless motor 31 is driven and controlled by repetition of six periods $T_1$ through $T_6$.

In a period $T_1$, as shown in FIG. 6A–FIG. 6F, the MOS FETs 36a and 36e are in "ON" state, and the MOS FETs 36b, 36c, 36d, and 36f are in "OFF" state. Therefore, in the period $T_1$, the current continuously flows in the coils 33a (FIG. 5) and 33b (FIG. 5). Furthermore, the current flows in the coil 33c (FIG. 5) through the diode 37f (FIG. 5) during a little beginning time of the period $T_1$, and thereafter, the current does not flow in the coil 33c. Thereby, in the period $T_1$, the voltage signal $V_A$ is held in an output voltage $V_{DD}$ of the direct current power supply 34 as shown in FIG. 6G, and the voltage signal $V_B$ is held at zero volt as shown in FIG. 6H. Furthermore, as shown in FIG. 6I, the voltage signal $V_C$ is held at zero volt when the current flows in the coil 33c through the diode 37f, and the voltage signal $V_C$ is increased nearly to the output voltage $V_{DD}$ when the current is stopped. Thereafter, the voltage signal $V_C$ is gradually reduced to zero volt caused by an induced voltage in accordance with the rotation of the rotor 32 during a no-current time $T_1$.

In a period $T_2$, as shown in FIG. 6A–FIG. 6F, the MOS FETs 36a and 36f are in "ON" state, and the MOS FETs 36b, 36c, 36d, and 36e are in "OFF" state. Therefore, in the period $T_2$, the current continuously flows in the coils 33a and 33c. Furthermore, the current flows in the coil 33b through the diode 37b (FIG. 5) during a little beginning time of the period $T_2$, and thereafter, the current does not flow in the coil 33b. Thereby, in the period $T_2$, the voltage signal $V_A$ is held in the output voltage $V_{DD}$ as shown in FIG. 6G, and the voltage signal $V_C$ is held at zero volt as shown in FIG. 6I. Furthermore, as shown in FIG. 6H, the voltage signal $V_B$ is held in the output voltage $V_{DD}$ when the current flows in the coil 33b through the diode 37b, and the voltage signal $V_B$ is reduced nearly to zero volt when the current is stopped. Thereafter, the voltage signal $V_B$ is gradually increased toward the output voltage $V_{DD}$ caused by the induced voltage in accordance with the rotation of the rotor 32 during a no-current time $T_{2'}$.

In a period $T_3$, as shown in FIG. 6A–FIG. 6F, the MOS FETs 36b and 36f are in "ON" state, and the MOS FETs 36a, 36c, 36d, and 36e are in "OFF" state. Therefore, in the period $T_3$, the current continuously flows in the coils 33b and 33c. Furthermore, the current flows in the coil 33a through the diode 37d (FIG. 5) during a little beginning time of the period $T_3$, and thereafter, the current does not flow in the coil 33a. Thereby, in the period $T_3$, the voltage signal $V_B$ is held in the output voltage $V_{DD}$ as shown in FIG. 6H, and the voltage signal $V_C$ is held at zero volt as shown in FIG. 6I. Furthermore, as shown in FIG. 6G, the voltage signal $V_A$ is held at zero volt when the current flows in the coil 33a through the diode 37d, and the voltage signal $V_A$ is increased nearly to the output voltage $V_{DD}$ when the current is stopped. Thereafter, the voltage signal $V_A$ is gradually reduced toward zero volt caused by the induced voltage in accordance with the rotation of the rotor 32 during a no-current time $T_3$.

In a period $T_4$, as shown in FIG. 6A–FIG. 6F, the MOS FETs 36b and 36d are in "ON" state, and the MOS FETs 36a, 36c, 36e, and 36f are in "OFF" state. Therefore, in the period $T_4$, the current continuously flows in the coils 33b and 33a. Furthermore, the current flows in the coil 33c through the diode 37c (FIG. 5) during a little beginning time of the period $T_4$, and thereafter, the current does not flow in the coil 33c. Thereby, in the period $T_4$, the voltage signal $V_B$ is held in the output voltage $V_{DD}$ as shown in FIG. 6H, and the voltage signal $V_A$ is held at zero volt as shown in FIG. 6G. Furthermore, as shown in FIG. 6I, the voltage signal $V_C$ is held in the output voltage $V_{DD}$ when the current flows in the coil 33c through the diode 37c, and the voltage signal $V_C$ is reduced nearly to zero volt when the current is stopped. Thereafter, the voltage signal $V_C$ is gradually increased toward the output voltage $V_{DD}$ caused by the induced voltage in accordance with the rotation of the rotor 32 during a no-current time $T_{4'}$.

In a period $T_5$, as shown in FIG. 6A–FIG. 6F, the MOS FETs 36c and 36d are in "ON" state, and the MOS FETs 36a, 36b, 36e, and 36f are in "OFF" state. Therefore, in the period $T_5$, the current continuously flows in the coils 33c and 33a. Furthermore, the current flows in the coil 33b through the diode 37e (FIG. 5) during a little beginning time of the period $T_5$, and thereafter, the current does not flow in the coil 33b. Thereby, in the period $T_5$, the voltage signal $V_C$ is held in the output voltage $V_{DD}$ as shown in FIG. 6I, and the voltage signal $V_A$ is held at zero volt as shown in FIG. 6G. Furthermore, as shown in FIG. 6H, the voltage signal $V_B$ is held at zero volt when the current flows in the coil 33b through the diode 37e, and the voltage signal $V_B$ is increased nearly to the output voltage $V_{DD}$ when the current is stopped. Thereafter, the voltage signal $V_B$ is gradually reduced toward zero volt caused by the induced voltage in accordance with the rotation of the rotor 32 during a no-current time $T_{5'}$.

In a period $T_6$, as shown in FIG. 6A–FIG. 6F, the MOS FETs 36c and 36e are in "ON" state, and the MOS FETs 36a, 36b, 36d, and 36f are in "OFF" state. Therefore, in the period $T_6$, the current continuously flows in the coils 33c and 33b. Furthermore, the current flows in the coil 33a through the diode 37a (FIG. 5) during a little beginning time of the period $T_6$, and thereafter, the current does not flow in the coil 33a. Thereby, in the period $T_6$, the voltage signal $V_C$ is held in the output voltage $V_{DD}$ as shown in FIG. 6I, and the voltage signal $V_B$ is held at zero volt as shown in FIG. 6H. Furthermore, as shown in FIG. 6G, the voltage signal $V_A$ is held in the output voltage $V_{DD}$ when the current flows in the coil 33a through the diode 37a, and the voltage signal $V_A$ is reduced nearly to zero volt when the current is stopped. Thereafter, the voltage signal $V_A$ is gradually increased toward the output voltage $V_{DD}$ caused by the induced voltage in accordance with the rotation of the rotor 32 during a no-current time $T_{6'}$.

The positional signal detecting circuit unit 38 compares the three voltage signals with a neutral point voltage appearing at the neutral point 33g (FIG. 5) of the armature winding 33, and integrates the respective comparison results linearly. Furthermore, the positional signal detecting circuit unit 38 compares the integrated results with a threshold voltage (zero volt), and thereby, obtains the three positional signals. The control circuit unit 39 forms the six control signals in accordance with the three positional signals issued from the positional signal detecting circuit unit 38 in order to control the respective switching states of the six MOS FETs 3a–36f.

As has been explained in the above, in the conventional sensorless brushless motor 31, the three positional signals corresponding to the rotational position of the rotor 32 are formed in accordance with the three voltage signals $V_A$, $V_B$, and $V_C$, respectively. Furthermore, the six control signals are formed in accordance with the three positional signals in order to control the respective switching states of the six MOS FETs 36a–36f. However, it is known that the following conditions (1) and (2) are required in order to obtain the above-mentioned three positional signals.

(1) The induced voltage in accordance with the rotation of the rotor 32 appears at the terminals 33d, 33f, and 33e, and is included in the three voltage signals $V_A$, $V_B$, and $V_C$.

(2) The induced voltage crosses the neutral point voltage appearing at the neutral point 33g of the armature winding 33.

For this reason, a crossing point between the induced voltage and the neutral point voltage is always the same position in no relation to variation of load of the brushless motor. Furthermore, the crossing point corresponds to the rotational position of the rotor 32. The details of this are described in the aforementioned the examined published Japanese patent application (TOKKO) SHO 59-36519.

However, in the aforementioned driving method, phase of the current to be applied to the armature winding 33 is controlled so as to be the same as the phase of the induced voltage in accordance with the rotation of the rotor 32. Thereby, there is the limit to increase high rotational speed and/or high output torque in this normal driving method.

Contrary to the normal driving method, as described in the unexamined published Japanese patent application (TOKKAI) HEI 4-281383 in detail, it is known that the brushless motor 31 is driven and controlled by field weakening control in order to obtain high rotational speed and/or high output torque. In the field weakening control, the phase of the current to be applied to the armature winding 33 is controlled so that the phase of the current leads in comparison with the phase of the induced voltage in accordance with the rotation of the rotor 32. For example, in the field weakening control, the phase of the current leads one by one until the rotational speed of the brushless motor 31 reaches a required rotational speed. In the case that the brushless motor 31 is driven at high rotational speed, the phase of the real current flowing in the armature winding 33 lags from the phase of a commanded current. Therefore, the phase of the real current is led by a phase adjusting circuit so that phase difference between the phase of the real current and the phase of the commanded current becomes small.

However, in the case that the brushless motor 31 is driven by the field weakening control, there is a problem that leading current flows in any one of the three coils 33a, 33b, and 33c through any one of the diodes 37a–37f in the above-mentioned no-current times $T_{1'}$–$T_{6'}$. (FIG. 6). As a result, the respective voltage signals $V_A$, $V_B$, and $V_C$ are included not only in the induced voltage in accordance with the rotation of the rotor 32 but also in other induced voltages such as an induced voltage in accordance with variations of current flowing in the three coils 33a, 33b, and 33c. That is, in the no-current time $T_{1'}$, the leading current flows in the coil 33c through the diode 37c, thereby, the voltage signal $V_C$ is held in the output voltage $V_{DD}$. In the no-current time $T_{2'}$, the leading current flows in the coil 33b through the diode 37e, thereby, the voltage signal $V_B$ is held at zero volt. In the no-current time $T_{3'}$, the leading current flows in the coil 33a through the diode 37a, thereby, the voltage signal $V_A$ is held in the output voltage $V_{DD}$. In the no-current time $T_{4'}$, the leading current flows in the coil 33c through the diode 37f, thereby, the voltage signal $V_C$ is held at zero volt. In the no-current time $T_{5'}$, the leading current flows in the coil 33b through the diode 37b, thereby, the voltage signal $V_B$ is held in the output voltage $V_{DD}$. In the no-current time $T_{6'}$, the leading current flows in the coil 33a through the diode 37d, thereby, the voltage signal $V_A$ is held at zero volt.

Thereby, each waveform of the voltage signals $V_A$, $V_B$, and $V_C$ does not appear the induced voltage in accordance with the rotation of the rotor 32. Therefore, even if the voltage signals $V_A$, $V_B$, and $V_C$ is compared with the neutral point voltage, it is impossible to obtain the positional signals corresponding to the rotational position of the rotor 32.

For example, in the case that the induced voltage in accordance with the rotation of the rotor 32 appears in a waveform of the voltage signal $V_A$, the waveform of the voltage signal $V_A$ is shown in FIG. 7A. In FIG. 7A, the abscissa is graduated with time, and the ordinate is graduated with voltage. Furthermore, the induced voltage in accordance with the rotation of the rotor 32 represents inclined parts of the voltage signal $V_A$. Besides, in the case that the induced voltage in accordance with the rotation of the rotor 32 does not appear in a waveform of the voltage signal $V_A$, the waveform of the voltage signal $V_A$ is shown in FIG. 7B. In FIG. 7B, the abscissa is graduated with time, and the ordinate is graduated with voltage.

Waveforms of the current flowing in the coil 33a and the voltage at the terminal 33d in a state as shown in FIG. 7B are shown in FIG. 8 as waveforms A and B, respectively. In waveform A of FIG. 8, the abscissa is graduated with time, and the ordinate is graduated with current. In waveform B of FIG. 8, the abscissa is graduated with time, and the ordinate is graduated with voltage. Waveforms A and B in FIG. 8 are drawn with their timing positions (represented by vertical broken lines) in agreement with each other.

As shown in waveforms A and B of FIG. 8, in a period $P_1$, the leading current flows in the coil 33a through the diode 37a in a direction from the neutral point 33g to the terminal 33d, so that the voltage at the terminal 33d is the same as the output voltage $V_{DD}$. In a period $P_2$, the leading current flows in the coil 33a through the diode 37d in a direction from the terminal 33d to the neutral point 33g, so that the voltage at the terminal 33d is the same as zero volt. In a period $P_3$, the current flows in the coil 33a through the MOS FET 36a in a direction from the terminal 33d to the neutral point 33g, so that the voltage at the terminal 33d is the same as the output voltage $V_{DD}$. In a period $P_4$, the leading current flows in the coil 33a through the diode 37d in a direction from the terminal 33d to the neutral point 33g, so that the voltage at the terminal 33d is the same as zero volt. In a period $P_5$, the leading current flows in the coil 33a through the diode 37a in a direction from the neutral point 33g to the terminal 33d, so that the voltage at the terminal 33d is the same as the output voltage $V_{DD}$. In a period $P_6$, the current flows in the coil 33a through the MOS FET 36d in a direction from the neutral point 33g to the terminal 33d, so that the voltage at the terminal 33d is the same as zero volt. As the lead of the phase of the current becomes larger, the leading current flowing in the coil 33a more increases.

In the case that the phase of the current leads the phase of the induced voltage in accordance with the rotation of the rotor 32, it is impossible to control the brushless motor 31. For example, if the phase of the current leads the phase of the above-mentioned induced voltage by over 90°, there is a problem that loss of synchronism is occurred in the brushless motor 31.

OBJECT AND SUMMARY OF THE INVENTION

The object of the present invention is to provide a brushless motor that can solve the aforementioned problems.

In order to achieve the above-mentioned object, a brushless motor in accordance with the present invention comprises:

a rotor having a magnet, an armature winding having three coils connected in three-phase star connection, the armature winding to being arranged in interlinkage with a magnetic field generated by the magnet, a semiconductor commutator means having six switching elements connected in three-phase bridge connection, three output terminals of the semiconductor commutator means is connected with the three coils, respectively, at least one current influence detector for detecting influence of an induced voltage generated by variations of current flowing in the armature winding, a positional signal detecting circuit means for receiving voltage signal appearing at the armature winding and an output signal issued from the at least one current influence detector, the positional signal detecting circuit means detecting a positional signal corresponding to rotational position of the rotor in accordance with the voltage signal and the output signal, a phase signal output circuit means for deciding phase of the current to be supplied in the armature winding responding to the positional signal issued from the positional signal detecting circuit means, and a control circuit means for issuing six control signals to the six switching elements responding to a phase signal issued from the phase signal output circuit means.

According to the above-mentioned brushless motor of the present invention, at least one current influence detector detects an induced voltage caused by the variations of the current flowing in an armature winding. Furthermore, a positional signal detecting circuit means detects a positional signal corresponding to rotational position of the rotor in accordance with the voltage signal appearing at the armature winding and the output signal issued from the at least one current influence detector. Thereby, even if leading currents flow in the armature winding when the brushless motor is driven and controlled by field weakening control, it is possible to eliminate the influence of the induced voltage generated by the leading currents in the voltage signal. As a result, the induced voltage in accordance with the rotation of the rotor only appear in the voltage signal, and it is possible to exactly obtain the positional signal corresponding to the rotational position of the rotor.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 6A is a waveform chart showing a switching state of the MOS FET 36a.

FIG. 6B is a waveform chart showing a switching state of the MOS FET 36b.

FIG. 6C is a waveform chart showing a switching state of the MOS FET 36c.

FIG. 6D is a waveform chart showing a switching state of the MOS FET 36d.

FIG. 6E is a waveform chart showing a switching state of the MOS FET 36e.

FIG. 6F is a waveform chart showing a switching state of the MOS FET 36f.

FIG. 6G is a waveform chart showing a voltage signal $V_A$.

FIG. 6H is a waveform chart showing a voltage signal $V_B$.

FIG. 6I is a waveform chart showing a voltage signal $V_C$.

FIG. 8 is a waveform chart (waveform B) showing a voltage at the terminal 33d in a state as shown in FIG. 7B.

DESCRIPTION OF THE PREFERRED EMBODIMENT

Hereafter, a preferred embodiment of the present invention is described with reference to the accompanying drawings.

Figure 1:
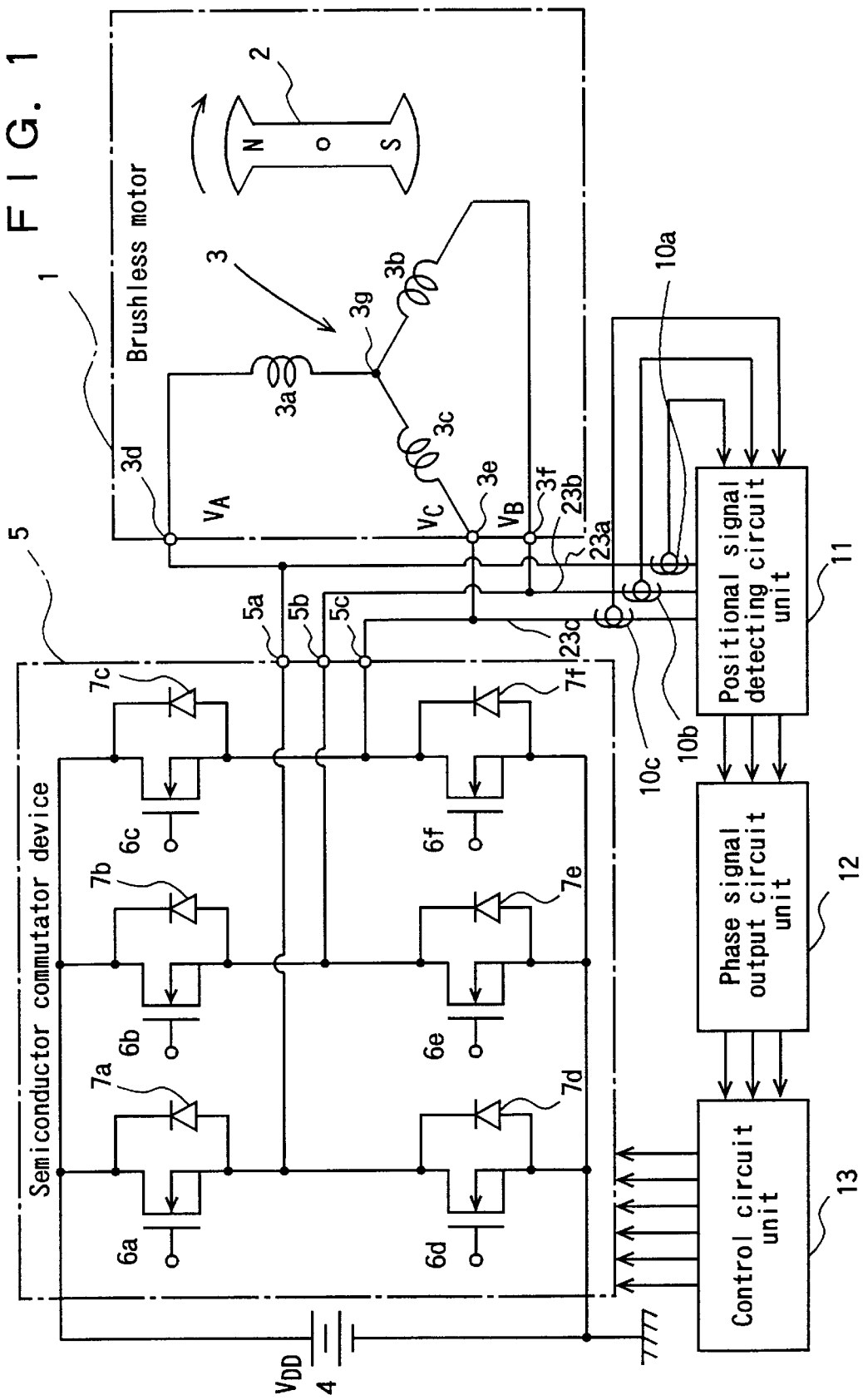
FIG. 1 is a circuit diagram showing a brushless motor of the present invention.

FIG. 1 is a circuit diagram showing a brushless motor of the present invention.

In FIG. 1, a brushless motor 1 comprises a rotor 2 having a magnet and an armature winding 3 to be made in interlinkage with a magnetic flux of a magnetic field generated from the magnet of the rotor 2. The armature winding 3 consists of three coils 3a, 3b, and 3c defined as A-phase, B-phase, and C-phase, respectively. The three coils 3a, 3b, and 3c are connected in three-phase star connection. The three coils 3a, 3b, and 3c are connected to a direct current power supply 4 through a semiconductor commutator device 5, so that the three coils 3a, 3b, and 3c are supplied with current each having phase difference of 120° therebetween. When the current is applied to the three coils 3a, 3b, and 3c, the rotor 2 is rotated by magnetic interaction of its magnetic flux with magnetic field generated by currents in the three coils 3a, 3b, and 3c.

The semiconductor commutator device 5 has six switching element parts each consisting of a MOS FET and a protective diode for the MOS FET. That is, six MOS FETs 6a–6f and six protective diodes 7a–7f for the respective six MOS FETs 6a–6f are provided in the semiconductor commutator device 5.

The six MOS FETs 6a–6f are connected in three-phase bridge connection in the semiconductor commutator device 5. Each drain of the MOS FETs 6a, 6b, and 6c is connected to a positive electrode of the direct current power supply 4, and each source of the MOS FETs 6d, 6e, and 6f is connected to a negative electrode of the direct current power supply 4. Furthermore, a source of the MOS FET 6a and a drain of the MOS FET 6d are connected to an output terminal 5a of the semiconductor commutator device 5. Similarly, a source of the MOS FET 6b and a drain of the MOS FET 6e are connected to an output terminal 5b, and also, a source of the MOS FET 6c and a drain of the MOS FET 6f are connected to an output terminal 5c. Each gate of the six MOS FETs 6a–6f receives control signal issued from the below-mentioned control circuit unit 13. Thereby, each switching state of the six MOS FETs 6a–6f is controlled by the control circuit unit 13.

The output terminal 5a is connected to a terminal 3d of the coil 3a by a wiring 23a. Similarly, the output terminal 5b is connected to a terminal 3f of the coil 3b by a wiring 23b, and the output terminal 5c is connected to a terminal 3e of the coil 3c by a wiring 23c. The three terminals 3d, 3f, and 3e are connected with a positional signal detecting circuit unit 11 by the wiring 23a, 23b, and 23c, respectively. Thereby, the positional signal detecting circuit unit 11 receives three voltage signals $V_A$, $V_B$, and $V_C$, induced at the three terminals 3d, 3f, and 3e, of the armature winding 3, respectively. Furthermore, the positional signal detecting circuit unit 11 receives three output signals $V_{1a}$, $V_{1b}$, and $V_{1c}$ issued from three electromagnetic devices 10a, 10b, and 10c, respectively.

The positional signal detecting circuit unit 11 detects three positional signals corresponding to rotational position of the rotor 2 in accordance with the three voltage signals $V_A$, $V_B$, and $V_C$ and the three output signals $V_{1a}$, $V_{1b}$, and $V_{1c}$. In the positional signal detecting circuit unit 11, the three output signals $V_{1a}$, $V_{1b}$, and $V_{1c}$ are used in supplemental calculations. The supplemental calculations are subtractions to subtract the three output signals $V_{1a}$, $V_{1b}$, and $V_{1c}$ from the three voltage signals $V_A$, $V_B$, and $V_C$, respectively. Thus, the positional signal detecting circuit unit 11 forms a positional signal detecting means for detecting the three positional signals.

The three electromagnetic devices 10a, 10b, and 10c are disposed on the three wirings 23a, 23b, and 23c, respectively. The three electromagnetic devices 10a, 10b, and 10c detect three induced voltages induced by variations (differential values) of respective three currents flowing in the three coils 3a, 3b, and 3c. The three electromagnetic devices 10a, 10b, and 10c output the three induced voltages to the positional signal detecting circuit unit 11 as the three output signals $V_{1a}$, $V_{1b}$, and $V_{1c}$, respectively. Thus, the three electromagnetic devices 10a, 10b, and 10c serve as a current influence detector for detecting influence of the respective induced voltages caused by the variations of the respective currents flowing in the three coils 3a, 3b, and 3c.

The three electromagnetic devices 10a, 10b, and 10c are the same construction, for example, the electromagnetic device 10a will be explained with reference to FIG. 2.

Figure 2:
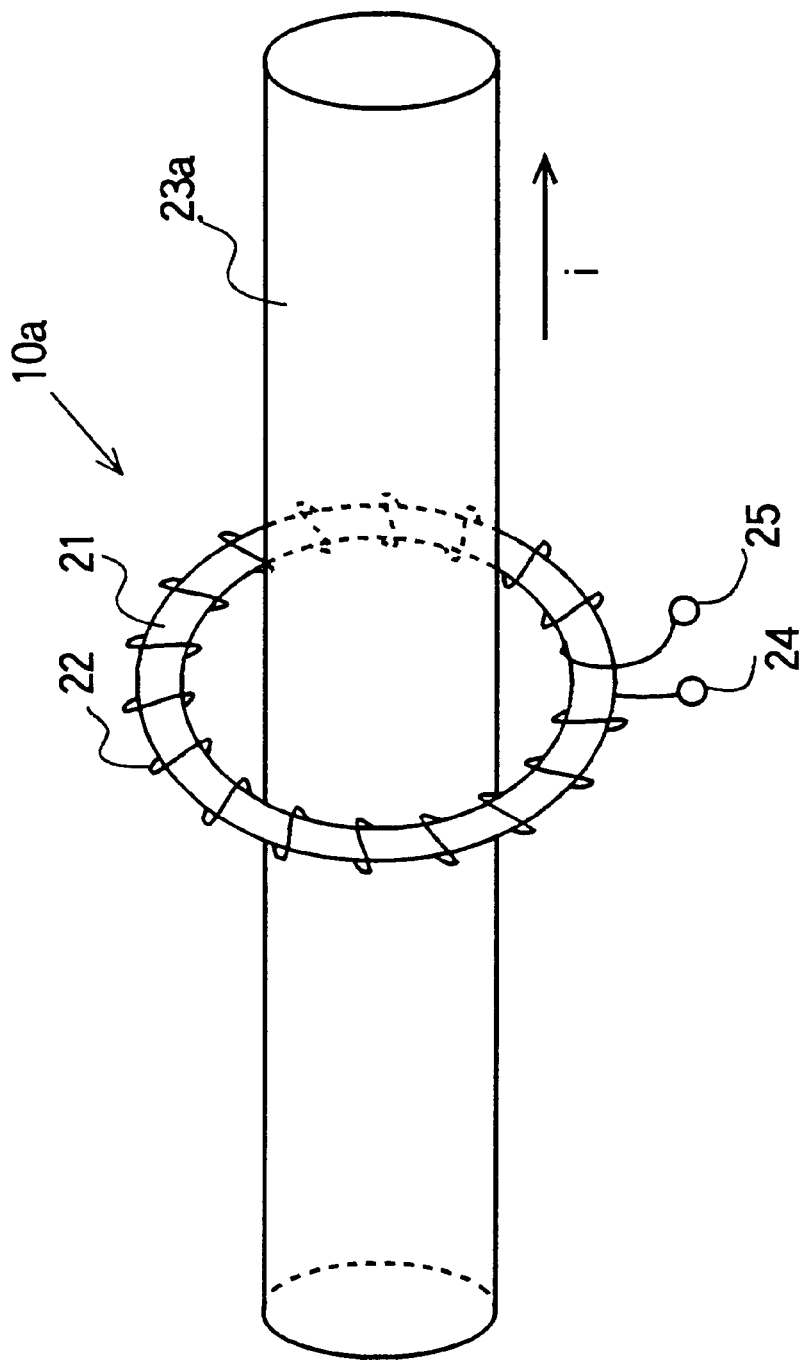
FIG. 2 is a perspective view showing an electromagnetic device of the present invention.

FIG. 2 is a perspective view showing an electromagnetic device of the present invention.

As shown in FIG. 2, the electromagnetic device 10a comprises a ring-shaped core 21 and a winding 22 wound around the ring-shaped core 21 in a toroidal shape. The ring-shaped core 21 is disposed at the wiring 23a so that the wiring 23a goes through inside of the ring-shaped core 21. Thereby, the electromagnetic device 10a and the wiring 23a constitute a current transformer;wherein, the wiring 23a serves as a primary winding and the winding 22 serves as a secondary winding. As a result, when a current i flows in the coil 3a, a voltage across both terminals 24 and 25 of the winding 22 is expressed to M(di/dt) by use of mutual inductance M of the electromagnetic device 10a. Furthermore, in the electromagnetic device 10a, the mutual inductance M is set to be equal to self-inductance L of the coil 3a.

As shown in FIG. 1, the positional signal detecting circuit unit 11 is connected to a phase signal output circuit unit 12, and outputs the three positional signals to the phase signal output circuit unit 12. In order to obtain high rotational speed and/or high output torque, the phase signal output circuit unit 12 decides the phases of the currents to flow in the three coils 3a, 3b, and 3c responding to the three positional signals, respectively. And the phase signal output circuit unit 12 outputs three phase signals to a control circuit unit 13. The control circuit unit 13 issues the six control signals to the respective gates of the six MOS FETs 6a–6f responding to the three phase signals issued from the phase signal output circuit unit 12. Thereby, leading currents flow in the three coils 3a, 3b, and 3c, and the brushless motor 1 is driven in field weakening control.

For example, the phase signal output circuit unit 12 compares a real rotational speed of the brushless motor 1 with a commanded rotational speed. In the case that the real rotational speed is smaller than the commanded rotational speed, the phase signal output circuit unit 12 outputs the three phase signals to the control circuit unit 13 so that the phases of the currents gradually lead by a predetermined angle(e.g.1°). And when the real rotational speed becomes equal to the commanded rotational speed, the phase signal output circuit unit 12 outputs the three phase signals to the control circuit unit 13 so that the phases of the currents are held in a fixed phase angle. Thus, the brushless motor 1 is driven in the field weakening control.

According to the brushless motor 1, the three electromagnetic devices 10a, 10b, and 10c detect the three induced voltages caused by the variations of the three currents flowing in the three coils 3a, 3b, and 3c, and output the three induced voltages to the positional signal detecting circuit unit 11 as the three output signals $V_{1a}$, $V_{1b}$, and $V_{1c}$, respectively. Furthermore, the positional signal detecting circuit unit 11 subtracts the three output signals $V_{1a}$, $V_{1b}$, and $V_{1c}$ from the three voltage signals $V_A$, $V_B$, and $V_C$, respectively. Thereby, in the respective three voltage signals $V_A$, $V_B$, and $V_C$, it is possible to eliminate the influence of the induced voltages generated by the variations of the three currents flowing in the three coils 3a, 3b, and 3c. Therefore, even if leading currents flow in the three coils 3a, 3b, and 3c when the brushless motor 1 is driven and controlled by the field weakening control, it is possible to eliminate the influence of the induced voltages caused by the leading currents in the three voltage signals $V_A$, $V_B$, and $V_C$. As a result, induced voltages in accordance with the rotation of the rotor 2 only appear in the three voltage signals $V_A$, $V_B$, and $V_C$, and it is possible to exactly obtain the positional signals corresponding to the rotational position of the rotor 2.

Figure 3:
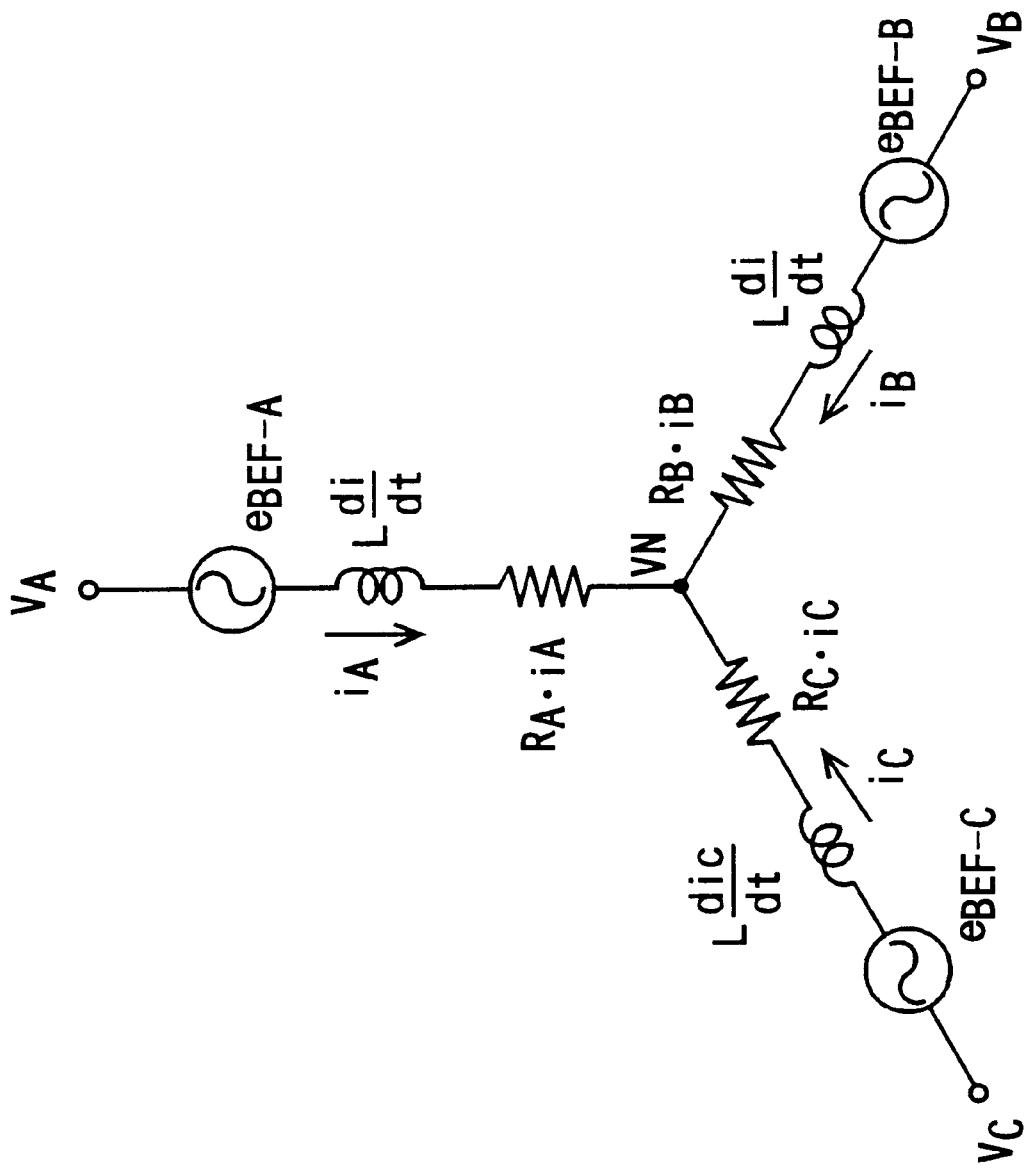
FIG. 3 is a circuit diagram showing an equivalent circuit of an armature winding of the present invention.

The three voltage signals $V_A$, $V_B$, and $V_C$ will be explained with reference to FIG. 3 showing an equivalent circuit of the armature winding 3 in detail.

In FIG. 3, $e_{BEF-A}$, $e_{BEF-B}$, and $e_{BEF-C}$ designate the induced voltages in the three coils 3a, 3b, and 3c in accordance with the rotation of the rotor 2, respectively. $L(di_A/dt)$ designates an induced voltage in the coil 3a when a current $i_A$ flows in the coil 3a. Similarly, $L(di_B/dt)$ designates an induced voltage in the coil 3b when a current $i_B$ flows in the coil 3b, and also, $L(di_C/dt)$ designates an induced voltage in the coil 3c when a current $i_C$ flows in the coil 3c. Moreover, $R_A \cdot i_A$ designates a voltage drop when the current $i_A$ flows in the coil 3a, wherein $R_A$ shows a resistance of the coil 3a. Similarly, $R_B \cdot i_B$ designates a voltage drop when the current $i_B$ flows in the coil 3b, wherein $R_B$ shows a resistance of the coil 3b. And also, $R_C \cdot i_C$ designates a voltage drop when the current $i_C$ flows in the coil 3c, wherein $R_C$ shows a resistance of the coil 3c. $V_N$ designates a neutral point voltage.

In FIG. 3, for example, the voltage signal $V_A$ is represented by the following equation (1):

$$V_A = e_{BEF-A} + L(di_A/dt) + R_A \cdot i_A + V_N \qquad (1)$$

A function of the positional signal detecting circuit unit 11 (FIG. 1) will be elucidated with reference to the equation (1).

When the current $i_A$ flows in the coil 3a, the electromagnetic device 10a (FIG. 2) forms a voltage $M(di_A/dt)$ between the both end terminals 24 and 25 (FIG. 2), and outputs the voltage $M(di_A/dt)$ to the positional signal detecting circuit unit 11 as the output signal $V_{1a}$. The positional signal detecting circuit unit 11 subtracts the output signal $V_{1a}$ from the voltage signal $V_A$. That is, the equation (1) is modified to the following equation (2):

$$V_A - M(di_A/dt) = e_{BEF-A} + L(di_A/dt) + R_A \cdot I_A + V_N - M(di_A/dt) \qquad (2)$$

In the right side of the equation (2), the voltage $M(diA/dt)$ is equal to the voltage $L(diA/dt)$. Furthermore, the voltage drop $R_A \cdot i_A$ is too negligibly in comparison with the induced voltage $e_{BEF-A}$. Therefore, it is possible to ignore the voltage drop $R_A \cdot i_A$. As a result, the equation (2) is modified to the following equation (3):

$$V_A - M(di_A/dt) \doteq e_{BEF-A} + V_N \qquad (3)$$

Furthermore, when the neutral point voltage is subtracted from the both sides of the equation (3), the equation (3) is changed to the following equation (4):

$$V_A - M(di_A/dt) - V_N \doteq e_{BEF-A} \qquad (4)$$

Thus, the positional signal detecting circuit unit 11 detects the induced voltage in accordance with the rotation of the rotor 2 (FIG. 1) with use of the equation (4), and detects the positional signal corresponding to rotational position of the rotor 2.

Figure 4:
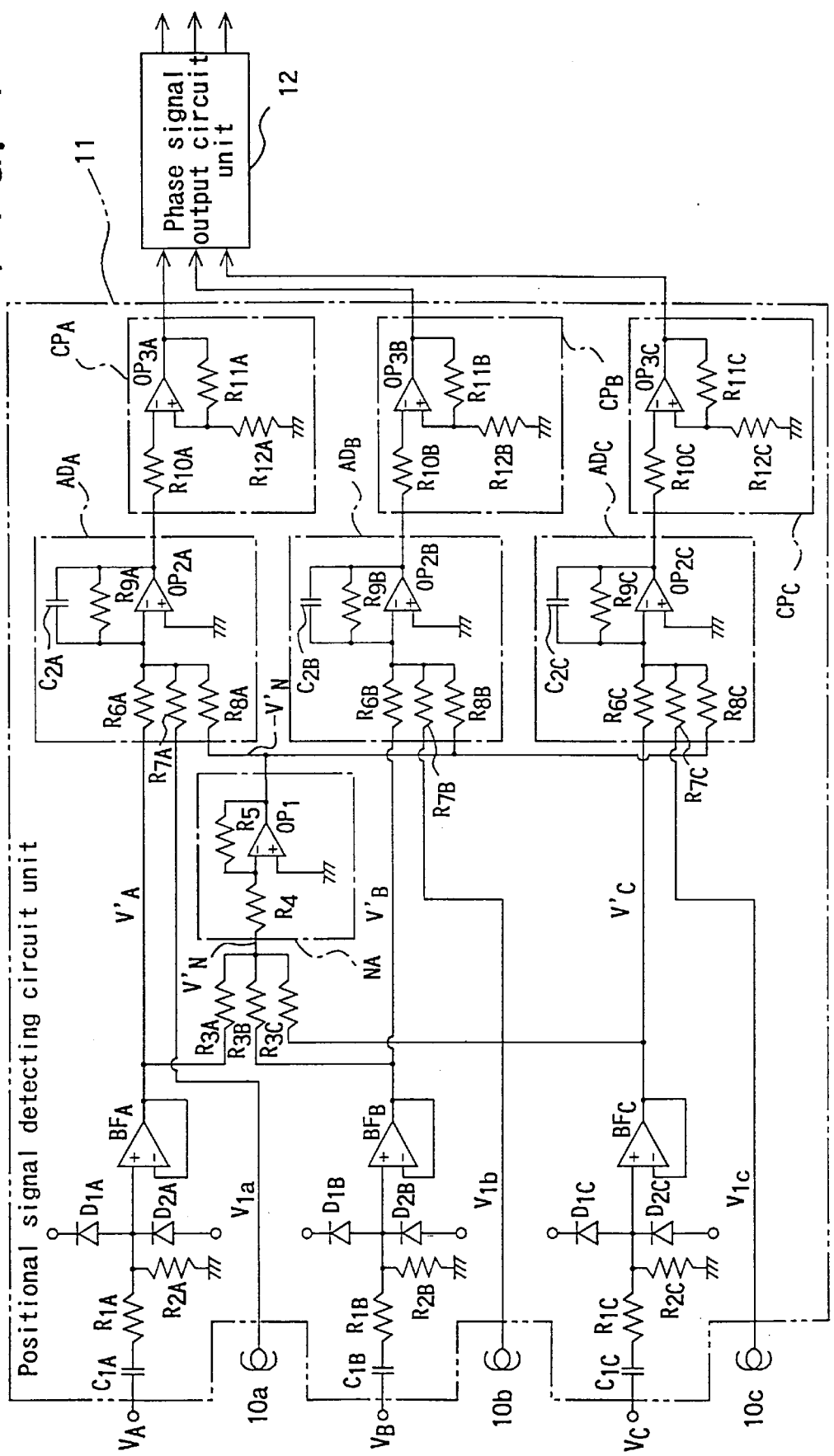
FIG. 4 is a concrete circuit diagram showing a positional signal detecting circuit unit of the present invention.
Figure 5:
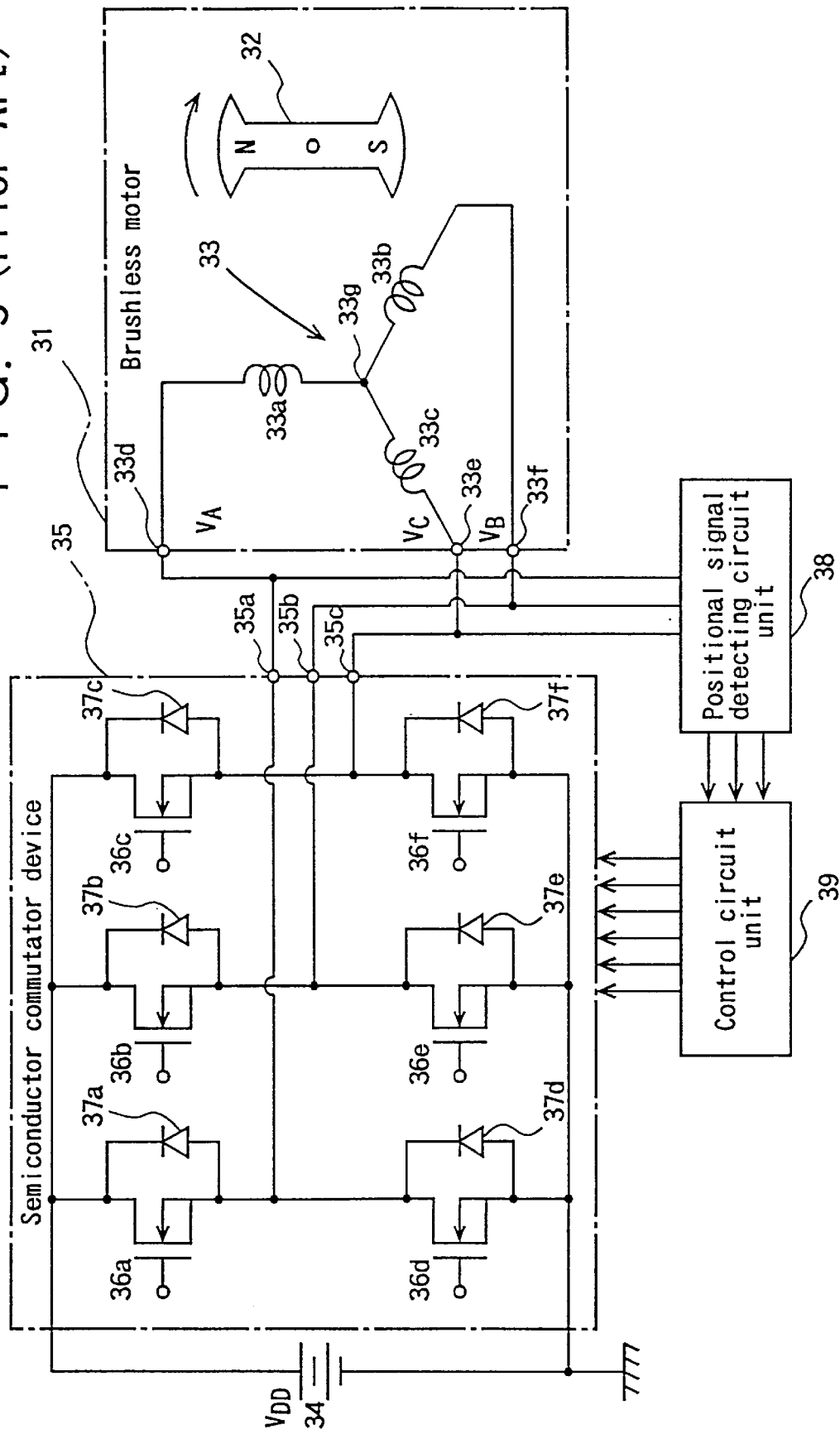
FIG. 5 is a circuit diagram showing a conventional sensorless type brushless motor.
Figure 7A:
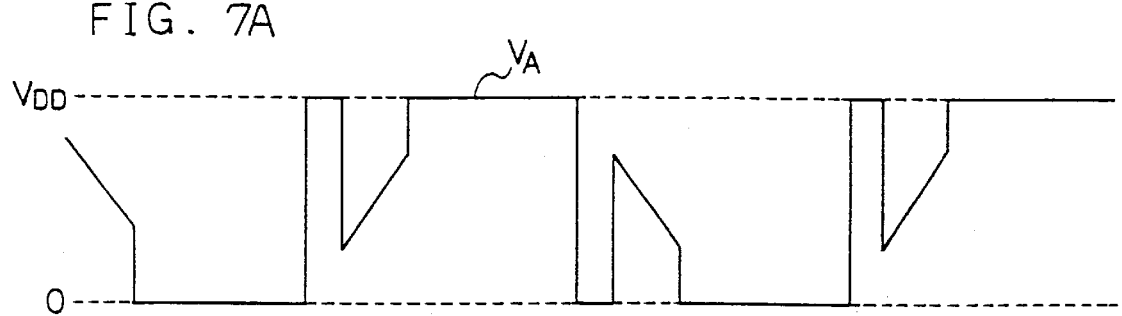
FIG. 7A is a waveform chart showing a voltage signal $V_A$ in the case that an induced voltage appears in a waveform of the voltage signal $V_A$.
Figure 7B:
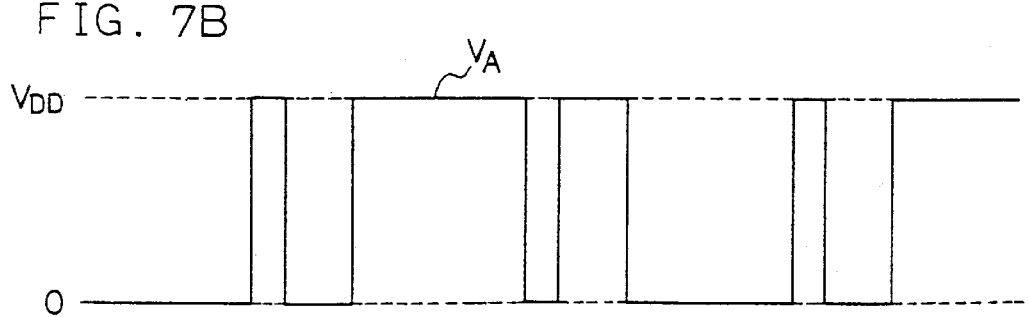
FIG. 7B is a waveform chart showing a voltage signal $V_A$ in the case that an induced voltage does not appear in a waveform of the voltage signal $V_A$.
Figure 8:
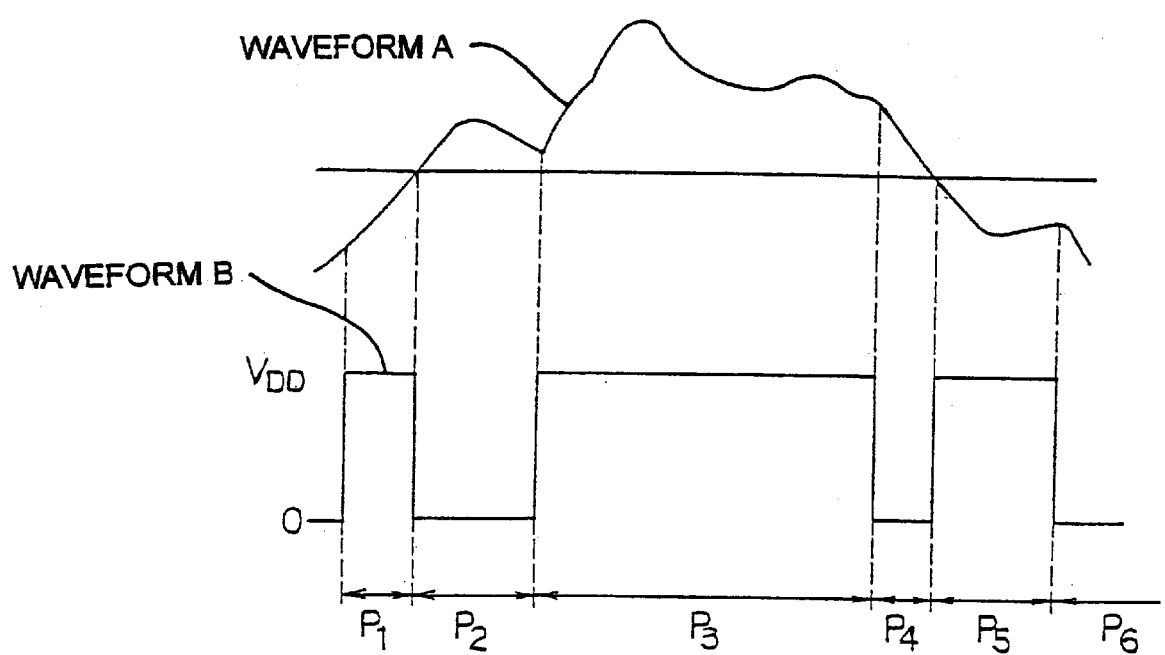
FIG. 8 is a waveform chart (waveform A) showing a current flowing in the coil 33a in a state as shown in FIG. 7B

A concrete construction of the positional signal detecting circuit unit 11 will be explained with reference to FIG. 4. FIG. 4 is a concrete circuit diagram showing a positional signal detecting circuit unit of the present invention.

In FIG. 4, the voltage signal $V_A$ is divided by resistances $R_{1A}$ and $R_{2A}$ after cutting off DC component of the voltage signal $V_A$ by a capacitor $C_{1A}$, and the voltage signal $V_A$ is input to a buffer $BF_A$ consisting of an operational amplifier. A voltage signal $V'_A$ is issued from an output terminal of the buffer $BF_A$. An input terminal of the buffer $BF_A$ is connected with protective diodes $D_{1A}$ and $D_{2A}$.

Similarly, the voltage signal $V_B$ is divided by resistances $R_{1B}$ and $R_{2B}$ after cutting off DC component of the voltage signal $V_B$ by a capacitor $C_{1B}$, and the voltage signal $V_B$ is input to a buffer $BF_B$ consisting of an operational amplifier. A voltage signal $V'_B$ is issued from an output terminal of the buffer $BF_B$. An input terminal of the buffer $BF_B$ is connected with protective diodes $D_{1B}$ and $D_{2B}$.

And also, the voltage signal $V_C$ is divided by resistances $R_{1C}$ and $R_{2C}$ after cutting off DC component of the voltage signal $V_C$ by a capacitor $C_{1C}$, and the voltage signal $V_C$ is input to a buffer $BF_C$ consisting of an operational amplifier. A voltage signal $V'_C$ is issued from an output terminal of the buffer $BF_C$. An input terminal of the buffer $BF_C$ is connected with protective diodes $D_{1C}$ and $D_{2C}$.

The output terminals of the buffer $BF_A$, $BF_B$, and $BF_C$ are connected to one ends of resistances $R_{3A}$, $R_{3B}$, and $R_{3C}$, respectively. The other ends of the resistances $R_{3A}$, $R_{3B}$, and $R_{3C}$ are connected with each other at a common connection point. Thereby, a pseudo neutral point voltage $V'_N$ corresponding to the neutral point voltage $V_N$ appears at the common connection point. The pseudo neutral point voltage $V'_N$ is inverted by an inverting amplifier $N_A$ consisting of an operational amplifier $OP_1$, and resistances $R_4$ and $R_5$.

The output terminals of the buffer $BF_A$, the electromagnetic device 10a, and the operational amplifier $OP_1$ are connected to inputs of an adder $AD_A$ with integrator consisting of an operational amplifier $OP_{2A}$, resistances $R_{6A}$–$R_{9A}$, and a capacitor $C_{2A}$. The adder $AD_A$ with integrator adds the voltage signal $V'_A$, the output signal $V_{1a}$, and an inverted pseudo neutral point voltage $-V'_N$. Thereby, the induced voltage $e_{BEF-A}$ is obtained at an output terminal of the adder $AD_A$ with integrator. The output terminal of the electromagnetic device 10a is connected with the adder $AD_A$ with integrator so that the output signal $V_{1a}$ is depolarized from the voltage signal $V'_A$. Therefore, contrary to the aforementioned explanation to add the voltage signal $V'_A$, the output signal $V_{1a}$, and an inverted pseudo neutral point voltage $-V'_N$ in the adder $AD_A$ with integrator, the output signal $V_{1a}$ is subtracted from the voltage signal $V'_A$.

An output terminal of the adder $AD_A$ with integrator is connected with a comparator $CP_A$ with hysteresis. The comparator $CP_A$ is constituted with an operational amplifier $OP_{3A}$ and resistances $R_{10A}$–$R_{12A}$, and compares the induced voltage $e_{BEF-A}$ with a predetermined threshold value. Thereby, the positional signal of the A-phase is obtained at the output terminal of the comparator $CP_A$. This positional signal rises or falls at a point lagging by a given phase angle behind a crossing point between the induced voltage $e_{BEF-A}$ and the neutral point voltage $V_N$.

Similarly, the output terminals of the buffer $BF_B$, the electromagnetic device 10b, and the operational amplifier $OP_1$ are connected to inputs of an adder $AD_B$ with integrator consisting of an operational amplifier $OP_{2B}$, resistances $R_{6B}$–$R_{9B}$, and a capacitor $C_{2B}$. The adder $AD_B$ with integrator adds the voltage signal $V'_B$, the output signal $V_{1b}$, and an inverted pseudo neutral point voltage $-V'_N$. Thereby, the induced voltage $e_{BEF-B}$ is obtained at an output terminal of the adder $AD_B$ with integrator. The output terminal of the electromagnetic device 10b is connected with the adder $AD_B$ with integrator so that the output signal $V_{1b}$ is depolarized from the voltage signal $V'_B$. Therefore, contrary to the aforementioned explanation to add the voltage signal $V'_B$, the output signal $V_{1b}$, and an inverted pseudo neutral point voltage $-V'_N$ in the adder $AD_B$ with integrator, the output signal $V_{1b}$ is subtracted from the voltage signal $V'_B$.

An output terminal of the adder $AD_B$ with integrator is connected with a comparator $CP_B$ with hysteresis. The comparator $CP_B$ is constituted with an operational amplifier $OP_{3B}$ and resistances $R_{10B}$–$R_{12B}$, and compares the induced voltage $e_{BEF-B}$ with a predetermined threshold value. Thereby, the positional signal of the B-phase is obtained at the output terminal of the comparator $CP_B$. This positional signal rises or falls at a point lagging by a given phase angle behind a crossing point between the induced voltage $e_{BEF-B}$ and the neutral point voltage $V_N$.

And also, the output terminals of the buffer $BF_C$, the electromagnetic device 10c, and the operational amplifier $OP_1$ are connected to inputs of an adder $AD_C$ with integrator consisting of an operational amplifier $OP_{2C}$, resistances $R_{6C}$–$R_{9C}$, and a capacitor $C_{2C}$. The adder $AD_C$ with integrator adds the voltage signal $V'_C$, the output signal $V_{1c}$, and an inverted pseudo neutral point voltage $-V'_N$. Thereby, the induced voltage $e_{BEF-C}$ is obtained at an output terminal of the adder $AD_C$ with integrator. The output terminal of the electromagnetic device 10c is connected with the adder $AD_C$ with integrator so that the output signal $V_{1c}$ is depolarized from the voltage signal $V'_C$. Therefore, contrary to the aforementioned explanation to add the voltage signal $V'_C$, the output signal $V_{1c}$, and an inverted pseudo neutral point voltage $-V'_N$ in the adder $AD_C$ with integrator, the output signal $V_{1c}$ is subtracted from the voltage signal $V'_C$.

An output terminal of the adder $AD_C$ with integrator is connected with a comparator $CP_C$ with hysteresis. The comparator $CP_C$ is constituted with an operational amplifier $OP_{3C}$ and resistances $R_{10C}$–$R_{12C}$, and compares the induced voltage $e_{BEF-C}$ with a predetermined threshold value. Thereby, the positional signal of the C-phase is obtained at the output terminal of the comparator $CP_C$. This positional signal rises or falls at a point lagging by a given phase angle behind a crossing point between the induced voltage $e_{BEF-C}$ and the neutral point voltage $V_N$.

The phase signal output circuit unit 12 decides the phases of the currents to be flown in the three coils 3a, 3b, and 3c responding to the three positional signals, respectively, in view of lags of the phases of the three positional signals and leads of the currents caused by the field weakening control.

In the respective adders $AD_A$, $AD_B$, and $AD_C$, switching noises in accordance with pulse width modulation are removed from the respective induced voltages $e_{BEF-A}$, $e_{BEF-B}$, and $e_{BEF-C}$. The explanation of operation of the pulse width modulation is omitted because the operation of the pulse width modulation is not the subject matter of the present invention.

Apart from the aforementioned explanation, wherein the mutual inductances M of the electromagnetic devices 10a, 10b, and 10c are set to be equal to self-inductances L of the coils 3a, 3b, and 3c, respectively, an alternative example may be configured such that the respective constructions of the adders $AD_A$, $AD_B$, and $AD_C$ are adjusted so that $M(di/dt)$ is equal to $L(di/dt)$. That is, coefficients of adding calculations in the adders $AD_A$, $AD_B$, and $AD_C$ are changed by adjustments of the resistances $R_{6A}$, $R_{6B}$, $R_{6C}$, $R_{7A}$, $R_{7B}$, and $R_{7C}$ and thereby, M(di/dt) is equal to L(di/dt).

In the aforementioned explanation, the three electromagnetic devices 10a, 10b, and 10c are mounted for three-phase coils 3a, 3b, and 3c of the armature winding 3, respectively. And the three output signals $V_{1a}$, $V_{1b}$, and $V_{1c}$ are output from the three electromagnetic devices 10a, 10b, and 10c to the positional signal detecting circuit unit 11, respectively, and the three positional signals are formed by the positional signal detecting circuit unit 11. Thereby, each switching signal for the six MOS FETs 6a–6f is formed in analog signal every phase of the three-phase. Alternatively, in the case that the switching signal is formed in digital signal, it is possible that one of the positional signal is formed by one of the output signal issued from one of the electromagnetic device. In the case that the switching signal is formed in digital signal, a known digital circuit is required to form all the switching signals by one of the positional signal. However, it is possible that two of the adders (e.g., $AD_B$ and $AD_C$ as shown in FIG. 4) are omitted. Therefore, in the case that the switching signal is formed in digital signal, it is possible that the construction of the positional signal detecting circuit unit 11 becomes simple.

Moreover, it is possible that the positional signals are formed by the output signals $V_{1a}$, $V_{1b}$, and $V_{1c}$ without use of the neutral point voltage $V_N$.

Apart from the aforementioned explanation, wherein the six MOS FETs 6a–6f are used in the semiconductor commutator device 5 as a switching element, an alternative construction may be such that six bipolar transistors are used in the semiconductor commutator device 5 as a switching element.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A brushless motor comprising:

a rotor having a magnet, an armature winding having three coils connected in three-phase star connection, said armature winding being arranged in interlinkage with a magnetic field generated by said magnet, a semiconductor commutator means having six switching elements connected in a three-phase bridge connection, three output terminals of said semiconductor commutator means being connected with said three coils, respectively, at least one current influence detector for detecting the influence of an induced voltage generated by variations of current flowing in said armature winding, a positional signal detecting circuit means for receiving a voltage signal appearing at said armature winding and an output signal issued from said at least one current influence detector, said positional signal detecting circuit means detecting a positional signal corresponding to the rotational position of said rotor in accordance with said voltage signal and said output signal, a phase signal output circuit means for determining a phase of the current to be supplied in said armature winding responding to said positional signal issued from said positional signal detecting circuit means, and a control circuit means for issuing six control signals to said six switching elements responding to a phase signal issued from said phase signal output circuit means, said at least one current influence detector having a ring-shaped core and a winding wound around said ring-shaped core in a toroidal shape, said ring-shaped core being disposed at a wiring for connecting said positional signal detecting circuit means and said semiconductor commutator means so that said wiring goes through the inside of said ring-shaped core so that the least one current influence detector and the wiring constitute a current transformer, and mutual inductance of the at least one current influence detector is equal to self-inductance of each of the three coils.

2. A brushless motor in accordance with claim 1, wherein said positional signal detecting circuit means subtracts said output signal from said voltage signal.

3. A brushless motor comprising:

a rotor having a magnet, an armature winding having three coils connected in three-phase star connection, said armature winding being arranged in interlinkage with a magnetic field generated by said magnet, a semiconductor commutator means having six switching elements connected in a three-phase bridge connection, three output terminals of said semiconductor commutator means being connected with said three coils, respectively, at least one current influence detector for detecting the influence of an induced voltage generated by variations of current flowing in said armature winding, a positional signal detecting circuit means for receiving a voltage signal appearing at said armature winding and an output signal issued from said at least one current influence detector, said positional signal detecting circuit means detecting a positional signal corresponding to the rotational position of said rotor in accordance with said voltage signal and said output signal, and thereby eliminating the influence of the induced voltage, a phase signal output circuit means for determining a phase of the current to be supplied in said armature winding responding to said positional signal issued from said positional signal detecting circuit means, and a control circuit means for issuing six control signals to said six switching elements responding to a phase signal issued from said phase signal output circuit means, said at least one current influence detector having a ring-shaped core and a winding wound around said ring-shaped core in a toroidal shape, said ring-shaped core being disposed at a wiring for connecting said positional signal detecting circuit means and said semiconductor commutator means so that said wiring goes through the inside of said ring-shaped core so that the least one current influence detector and the wiring constitute a current transformer, and mutual inductance of the at least one current influence detector is equal to self-inductance of each of the three coils.

4. A brushless motor in accordance with claim 3, wherein said positional signal detecting circuit means subtracts said output signal from said voltage signal.

* * * * *